(12) United States Patent
Idei et al.

(10) Patent No.: US 7,689,573 B2
(45) Date of Patent: Mar. 30, 2010

(54) PREFETCH APPLIANCE SERVER

(75) Inventors: Hideomi Idei, Yokohama (JP);
Kazuhiko Mogi, Yokohama (JP);
Norifumi Nishikawa, Tokyo (JP);
Toyohiro Nomoto, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 228 days.

(21) Appl. No.: 11/455,047

(22) Filed: Jun. 19, 2006

(65) Prior Publication Data

US 2007/0005660 A1 Jan. 4, 2007

Related U.S. Application Data

(63) Continuation of application No. 10/409,989, filed on Apr. 7, 2003, now Pat. No. 7,092,971.

(30) Foreign Application Priority Data

Dec. 11, 2002 (JP) ............................. 2002-358838

(51) Int. Cl.
*G06F 17/00* (2006.01)
*G06F 15/173* (2006.01)
(52) U.S. Cl. .................. 707/100; 709/226; 707/200
(58) Field of Classification Search ............. 707/1–10, 707/100–104.1, 200, 205
See application file for complete search history.

(56) References Cited

U.S. PATENT DOCUMENTS

| 5,305,389 | A | 4/1994 | Palmer |
| 5,317,727 | A | 5/1994 | Tsuchida et al. ............... 707/2 |
| 5,590,300 | A | 12/1996 | Lautzenheiser ............. 711/202 |
| 5,765,213 | A | 6/1998 | Ofer .......................... 711/213 |
| 5,778,436 | A | 7/1998 | Kedem et al. |
| 5,809,560 | A | 9/1998 | Schneider |
| 5,812,996 | A | 9/1998 | Rubin et al. .................... 707/2 |
| 5,822,757 | A | 10/1998 | Chi |
| 5,918,246 | A | 6/1999 | Goodnow et al. |
| 6,065,037 | A | 5/2000 | Hitz et al. .................... 709/200 |
| 6,199,068 | B1 * | 3/2001 | Carpenter .................... 707/100 |

(Continued)

FOREIGN PATENT DOCUMENTS

JP 2230373 9/1990

(Continued)

OTHER PUBLICATIONS

Evaluator Group, Inc., "Virtualization of Disk Storage", The Evaluator Series, Sep. 2000, pp. 1-12.

(Continued)

*Primary Examiner*—Hosain T Alam
*Assistant Examiner*—Navneet K Ahluwalia
(74) *Attorney, Agent, or Firm*—Brundidge & Stanger, P.C.

(57) ABSTRACT

In a system in which a DB is built in a virtualization environment, a management server obtains DB processing information such as a DB processing execution plan and a degree of processing priority from a DBMS, predicts data to be accessed in the near future and the order of such accesses based on the information, instructs to read into caches of storage devices data to be accessed in the near future based on the prediction results, and reads the data that will be accessed in the nearest future into a cache memory within the management server.

6 Claims, 13 Drawing Sheets

U.S. PATENT DOCUMENTS

| | | |
|---|---|---|
| 6,260,116 B1 | 7/2001 | Davis et al. |
| 6,381,677 B1 | 4/2002 | Beardsley et al. |
| 6,516,389 B1 | 2/2003 | Uchihori |
| 6,567,894 B1 | 5/2003 | Hsu et al. |
| 6,606,659 B1 | 8/2003 | Hegli et al. ............... 709/225 |
| 6,675,280 B2 | 1/2004 | Cooksey et al. |
| 6,687,807 B1 | 2/2004 | Damron |
| 6,728,840 B1 | 4/2004 | Shatil et al. |
| 6,766,430 B2 | 7/2004 | Arakawa et al. |
| 2002/0002658 A1 | 1/2002 | Okayasu |
| 2003/0093647 A1* | 5/2003 | Mogi et al. .................. 712/1 |
| 2003/0105940 A1 | 6/2003 | Cooksey et al. |
| 2003/0126116 A1 | 7/2003 | Chen et al. .................. 707/3 |
| 2003/0172149 A1 | 9/2003 | Edsall et al. ............... 709/224 |
| 2003/0204597 A1* | 10/2003 | Arakawa et al. ........... 709/226 |
| 2003/0208660 A1 | 11/2003 | van de Waerdt |
| 2003/0212668 A1 | 11/2003 | Hinshaw et al. .............. 707/3 |
| 2003/0221052 A1 | 11/2003 | Yechiel |
| 2004/0054648 A1 | 3/2004 | Mogi et al. |
| 2004/0088504 A1 | 5/2004 | Hsu et al. |
| 2004/0236772 A1 | 11/2004 | Arakawa et al. |

FOREIGN PATENT DOCUMENTS

| | | |
|---|---|---|
| JP | 65935 | 1/1994 |
| JP | 9274544 | 10/1997 |
| JP | 11212733 | 8/1999 |
| JP | 2000148652 | 5/2000 |
| JP | 2001222381 | 8/2001 |
| JP | 2002082775 | 3/2002 |
| JP | 2002196960 | 7/2002 |

OTHER PUBLICATIONS

Patterson, et al "Informed Prefetching and Caching", Department of Electrical and Computer Engineering, Carnegie Mellon University, SIGOPS '95 Dec. 1995 USA, pp. 79-95.

Mukai, et al "Evaluation of Prefetching Mechanism Using Access Plan on Intelligent Disk", Institute of Industrial Science, the University of Tokyo, Japan, pp. 1-8.

K. Mukai et al, "Evaluation of Prefetching Mechanism Using Access Plan on Intelligent Disk".

* cited by examiner

FIG. 2

Mapping Information (116)

| VIRTUAL VOLUME NAMES (200) | VIRTUAL BLOCK NUMBER SETS (202) | STORAGE DEVICE ID (204) | PHYSICAL DISK ID (206) | PHYSICAL BLOCK NUMBER SETS (208) |
|---|---|---|---|---|
| VVOL1 | 0 - 3999 | S01 | D0101 | 1000 - 4999 |
| | 4000 - 7999 | S02 | D0201 | 1000 - 4999 |
| | 8000 - 11999 | S03 | D0301 | 1000 - 4999 |
| | ⋮ | ⋮ | ⋮ | ⋮ |
| VVOL2 | 0 - 5999 | S01 | D0108 | 10000 - 15999 |
| | 6000 - 11999 | S02 | D0208 | 12000 - 17999 |
| | 12000 - 17999 | S03 | D0308 | 8000 - 13999 |
| | ⋮ | ⋮ | ⋮ | ⋮ |
| ⋮ | ⋮ | ⋮ | ⋮ | ⋮ |

FIG. 3

DBMS INFORMATION (118)

Table 300:

| EXECUTION INFORMATION ID (302) | DBMS NAME (304) | DB PROCESSING PLAN IDs (306) | DEGREES OF PROCESSING PRIORITY (307) | CACHE PROCESSING FLAGS (308) |
|---|---|---|---|---|
| 0 | DBMS1 | 37129 | 3 | 1 |
| 1 | DBMS2 | 14485 | 1 | 0 |
| ⋮ | ⋮ | ⋮ | ⋮ | ⋮ |

DBMS PROCESSING PLAN INFORMATION (310):

| EXECUTION INFORMATION ID (312) | EXECUTION INFORMATION INTERNAL SEQUENCE NUMBERS (314) | ACCESS DESTINATION DATA STRUCTURES (316) | ACCESS DESTINATION VIRTUAL VOLUME (318) | ACCESS DESTINATION VIRTUAL BLOCK NUMBER SETS (320) | (322) |
|---|---|---|---|---|---|
| 0 | 0 | T1 | VVOL1 | 0 - 9999 | 1 |
| | 1 | T2 | VVOL2 | 0 - 15999 | 2 |
| | 2 | INDX1 | VVOL3 | 0 - 4999 | 3 |
| | 3 | T1 | VVOL1 | 0 - 9999 | 3 |
| 1 | 0 | INDX2 | VVOL3 | 5000 - 11999 | 1 |
| | ⋮ | ⋮ | ⋮ | ⋮ | ⋮ |

PREFETCH APPLIANCE SERVER

The present application is a continuation of application Ser. No. 10/409,989, filed Apr. 7, 2003, now U.S. Pat. No. 7,092,971 the contents of which are incorporated herein by reference.

BACKGROUND OF THE INVENTION

1. Field of the Invention

The present invention relates to a technology that predicts data that, of data stored in storage devices, will be accessed in the near future by a computer and that prefetches the data into a cache memory.

2. Related Background Art

At present, there are numerous applications that use data bases (hereafter called "DBs"), and this has made DB management systems (hereinafter called "DBMS"), which are software that perform a series of processing and management regarding DBs, extremely important. One of the characteristics of DBs is that they handle a huge amount of data. For this reason, a common mode for many systems on which a DBMS operates is one in which storage devices with large storage capacity disks are connected to a computer on which the DBMS runs and DB data are stored on the disks, As long as data are stored on the disks of the storage devices, accesses to disks must necessarily be made when performing any processing that concerns the DB. Accesses to disks accompany mechanical operations such as data seek, which require far more time than calculations and data transfer that take place in the CPU or memory within a computer. In view of this, the mainstream storage devices reduce data accesses to disks by providing a cache memory within storage devices, retaining the data read from the disks in the cache memory, and reading data from the cache memory when accessing the same data. In addition, a technology is in development to predict data that will be read in the near future based on a series of data accesses and to prefetch the predicted data into the cache memory.

In view of the above, U.S. Pat. No. 5,317,727 describes a technology that improves the performance of DBMS by reducing unnecessary accesses and prefetching required data. In this technology, in a section that executes a query from a user, an execution plan for the query, data access properties, cache memory volume, and I/O load are taken into consideration in order to execute prefetching, determine the prefetching volume, and to manage cache (buffer), thereby improving the I/O access performance to improve the performance of the DBMS.

Kagehiro Mukai, et al. "Evaluation of Prefetching Mechanism That Uses an Access Plan in Highly Functional Disks." 11$^{th}$ Data Engineering Workshop DEWS 2000 Collection of Essays, Specialized Committee on Data Engineering Research, Electronic Information Communication Academy, July 2000, Seminar No. 3B-3 describe a DB that uses a relational data base management system (RDBMS) for improving the performance of DBMS through highly functional storage devices. When an execution plan for a query processing in an RDBMS is provided to a storage device as application-level knowledge, the storage device, after reading an index of a certain table in the RDBMS, becomes capable of determining which blocks that store the data corresponding to the table should be accessed. As a result, the storage device can then consecutively access indices to ascertain groups of blocks that retain the data of tables that should be accessed based on the indices, and by effectively scheduling accesses to those blocks, shorten the total access time to the data. This processing can be executed independently of a computer on which the DBMS is executed, so that there is no need to wait for commands from the computer. Furthermore, when data is divided among a plurality of physical storage devices, each of the physical storage devices can be accessed in parallel, which can further shorten the execution time for DBMS's processing.

R. H. Patterson, et al. "Informed Prefetching and Caching." Proc. of the 15$^{th}$ ACM Symposium on Operating System Principles, December 1995: 79-95 discusses a function, as well as its control method, of a computer's OS to prefetch data into a file cache in the computer by using clues issued by applications concerning files and access destination regions that would be accessed in the near future.

In the meantime, the amount of data stored in storage devices, foremost among them RAID, has grown significantly in recent years, and the storage capacity of the storage devices themselves has increased; at the same time, the number of storage devices and file servers connected to networks has also seen a rise. As a result of this, however, various problems have arisen, such as increasingly complicated management of large capacity storage regions, increasingly complicated management of information equipment due to dispersed installation locations of storage devices and servers, and concentration of load on certain storage devices. Currently, a technology called virtualization is being researched and developed in order to solve these problems.

The virtualization technology is divided primarily into three types, as described in The Evaluator Series Virtualization of Disks Storage, WP-0007-1, September 2000 by Evaluator Group, Inc.

The first is a mode in which each server connected to a network shares information that manages storage regions of storage devices. Each server uses its volume manager to access the storage devices.

The second is a mode in which a virtualization server (hereinafter called a "management server") manages as virtual storage regions all storage regions of storage devices connected to a network. The management server accepts access requests to the storage devices from servers, accesses storage regions of the subordinate storage devices, and sends the results as a reply to the request source server.

The third is a mode like the second in which a management server manages as virtual storage regions all storage regions of storage devices connected to a network. The management server accepts access requests to the storage devices from servers and sends as a reply to the request source server position information concerning storage regions that actually store the data to be accessed. The server then accesses the storage regions of the storage devices based on the position information.

In systems to which a virtualization technology is applied, a DBMS is used in an extremely high proportion due to the enormous amount of data that is handled. And due to the enormous amount of data that is accessed, the disk access performance within a storage device has a great impact on the performance of the entire system.

Utilizing cache memory and prefetching data in prior art described above are specialized technology within storage devices. Technologies in the first through third documents described above improve performance by linking the DBMS processing with storage devices, but they are not designed to work in the virtualization environment.

SUMMARY OF THE INVENTION

The present invention relates to a data prefetching technology in a system in which a DB is built in a virtualization environment.

A DBMS generally prepares an execution plan before executing a query provided and executes the processing according to the plan. An execution plan for a query indicates a procedure of how to access which data in what order and, after accessing, what processing to execute in a DB host.

In accordance with an embodiment of the present invention, in a system in which a DB is built in a virtualization environment, data that corresponds to a DB processing can be prefetched by having a management server obtain DB processing information, including an execution plan, from a DBMS before the DBMS executes the DB processing; specify data that would be accessed in the near future and the order of such accesses based on the DB processing information; read into a cache of a storage device the data that would be accessed in the near future based on the results of the data specification; and read into a cache memory of the management server the data that would be accessed in the near future.

Other features and advantages of the invention will be apparent from the following detailed description, taken in conjunction with the accompanying drawings that illustrate, by way of example, various features of embodiments of the invention.

BRIEF DESCRIPTION OF DRAWINGS

FIG. 2 shows one example of mapping information of a management server. FIG. 3 shows one example of DBMS information of the management server.

DESCRIPTION OF PREFERRED EMBODIMENTS

Preferred embodiments of the present invention are described below. However, the present invention is not limited to these embodiments.

Referring to FIGS. 1 through FIG. 14, the first embodiment is described.

Figure 1:
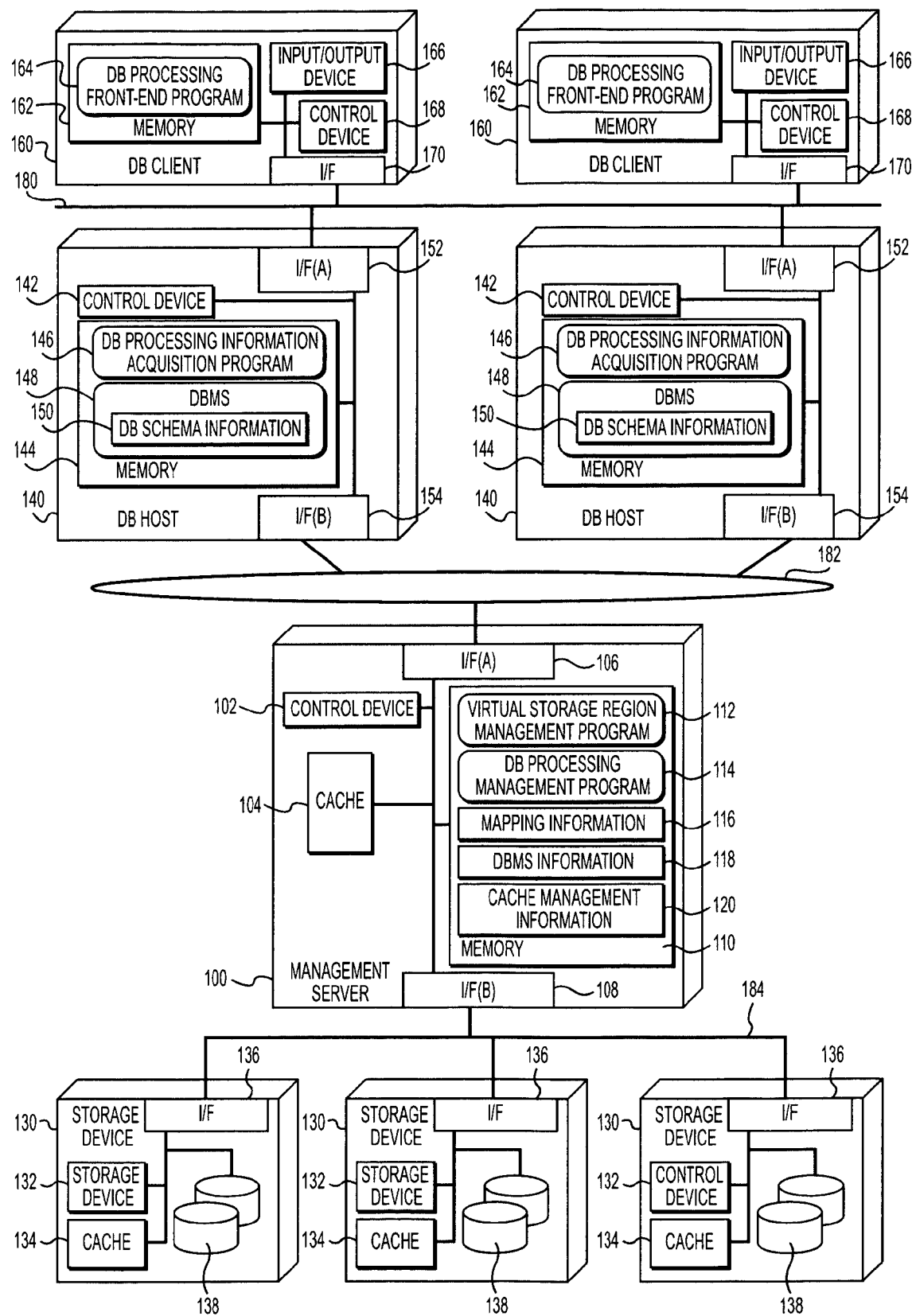
FIG. 1 shows a diagram of one example of a system configuration in accordance with a first embodiment of the present invention.

FIG. 1 is a diagram of a computer system to which the first embodiment of the present invention is applied.

The system of the present embodiment includes a management server 100, storage devices 130, DB hosts 140, DB clients 160, a network 184 that connects the management server 100 with the storage devices 130, a network 182 that connects the management server 100 with the DB hosts 140, and a network 180 that connects the DB hosts 140 with the DB clients 160.

Data communication between the management server 100 and the storage devices 130 takes place via the network 184. Data communication between the management server 100 and the DB hosts 140 takes place via the network 182. Data communication between the DB hosts 140 and the DB clients 160 takes place via the network 180. In the present system, the DB clients 160, the DB hosts 140 and the storage devices 130 may each be singular or plural in number.

The management server 100 has a control device (a control processor) 102, a cache 104, an I/F (A) 106 to connect with the network 182, an OF (B) 108 to connect with the network 184, and a memory 110. The memory 110 stores a virtual storage region management program 112, a DB processing management program 114, mapping information 116, DBMS information 118, and cache management information 120. The virtual storage region management program 112 is a program that operates on the control device 102 and uses the mapping information 116 to manage all physical storage regions of the subordinate storage devices 130 as virtual storage regions. The DB processing managing program 114 is a program that also operates on the control device 102 and uses the DBMS information 118 to manage information concerning DB processing executed by DBMSs 148 of the DB hosts 140. In addition, the DB processing management program 114 uses the cache management information 120 to manage the cache 104 of the management server 100. Detailed processing of these programs is described later in conjunction with the description of processing flow.

Each of the storage devices 130 has a control device (a control processor) 132, a cache 134, an I/F 136 to connect with the network 184, and disks 138; each of the storage devices 130 controls its cache 134 and the disks 138 through its control device 132. Actual data of DB is stored on the disks 138.

Each of the DB hosts 140 is a computer provided with a control device (a control processor) 142, a memory 144, an 1/F (A) 152 to connect with the network 180, and an 1/F (B) 154 to connect with the network 182. The memory 144 stores a DB processing information acquisition program 146 and the DBMS 148. The DBMS 148 has DB schema-information 150. The DB processing information acquisition program 146 is a program that operates on the control device 142; it accepts DB processing requests from users via DB processing front-end programs 164 of the DB clients 160, acquire plan information for each DB processing from the DBMS 148, and sends the information as DB processing information 600 to the management server 100. The DBMS 148 is a program that also operates on the control device 142 and manages DB tables, indices and logs as the DB schema information 150. In addition, in response to DB processing requested from users and accepted, it acquires necessary data from the storage devices 130 via the management server 100, executes the DB processing, and sends the results of the execution to the DB clients 160 that are the request sources.

Each of the DB clients 160 is a computer provided with a memory 162, an input/output device 166 for the input of DB processing by users and for the output of processing results, a control device (a control processor) 168, and an OF 170 to connect with the network 180. The memory 162 stores the DB processing front-end program 164. The DB processing front-end program 164 is a program that operates on the control device 168, and it accepts DB processing from users and sends it to the DB hosts 140. It also outputs to the input/output device 116 the result of executing DB processing received from the DB hosts 140.

FIG. 2 shows an example of the configuration of the mapping information 116. The mapping information 116 consists of virtual volume names 200, virtual block number sets 202, storage device IDs 204, physical disk IDs 206 and physical block number sets 208.

Each virtual volume name 200 is a name used to identify a virtual volume, and each virtual block number set 202 is a set of block numbers that indicates storage regions within a virtual volume. Each storage device ID 204 is an identifier for one of the storage devices 130 that actually stores data corresponding to a virtual volume region indicated by the corresponding virtual volume name 200 and the corresponding virtual block number set 202. Each physical disk ID 206 is an identifier for one of the physical disks 138 of one of the storage devices 130 that actually stores data corresponding to a virtual volume region indicated by the corresponding virtual volume name 200 and the corresponding virtual block number set 202. Each physical block number set 208 is a set of physical block numbers in one of the physical disks 138 that actually stores data corresponding to a virtual volume region indicated by the corresponding virtual volume name 200 and the corresponding virtual block number set 202. Using as an example the first entry in FIG. 2, a virtual volume region that corresponds to virtual block numbers "0-3999" in the virtual volume name "VVOL1" in reality exists at physical block numbers "1000-4999" on a physical disk identified as "D0101" of a storage device identified as "S01."

FIG. 3 shows an example of the configuration of the DBMS information 118. The DBMS information 118 consists of execution information ID management information 300 and DBMS processing plan information 310.

The execution information ID management information 300 includes execution information IDs 302, DBMS names 304, DB processing plan Ms 306, degrees of processing priority 307, and cache processing flags 308. Each execution information ID 302 is a unique ID that is assigned when the DB processing management program 114 receives the DB processing information 600. The execution information ID 302 is used to correlate the execution information ID management information 300 to the corresponding DBMS processing plan information 310, and to manage the DB processing information 600 received. Each DBMS name 304 is a name that identifies the DBMS that will execute a DB processing managed by the given entry, and stores a DBMS name that is identical to a DBMS name 602 in the DB processing information 600 that was received from one of the DB hosts 140. Each DB processing plan ID 306 is an ID that identifies a DB processing plan for a DB processing managed by the given entry, and stores the ID of a DB processing plan ID 603 in the DB processing information 600. Each degree of processing priority 307 indicates the degree of priority of a prefetching processing in a DB processing managed by the given entry, and stores the value of a degree of processing priority 604 in the DB processing information 600. Each cache processing flag 308 is a flag that indicates the state of the cache processing for the given entry. If the flag is "0," it indicates that the cache processing is unexecuted; if the flag is "1," it indicates that the cache processing is being executed. The initial value is "0."

The DBMS processing plan information 310 includes execution information IDs 312, execution information internal sequence numbers 314, access destination data structures 316, access destination virtual volume names 318, access destination virtual block number sets 320, and execution sequences 322. Each execution information ID 312 corresponds to the execution information ID 302 of the execution information ID management information 300 and is used to manage DB processing. Each execution information internal sequence number 314 is a number that indicates the sequence in which a corresponding data structure is accessed during a DB processing managed by the corresponding execution information ID 312. The DB processing management program 114 follows the execution information internal sequence numbers 314 to execute data prefetching. Each access destination data structure 316, access destination virtual volume name 318 and access destination virtual block number set 320 indicate the structure of data to be accessed in the DB processing managed by the given entry, the virtual volume name and virtual block number sets of the virtual volume that stores the data structure, respectively, and store an access destination data structure 614, an access destination virtual volume name 616, and an access destination virtual block number set 618, respectively, of DB processing plan information 606 described later. Each execution sequence 322 is information inherited from an execution sequence 612 of the DB processing plan information 606 as the sequence of execution for the DB processing managed by the given entry.

Figure 4:
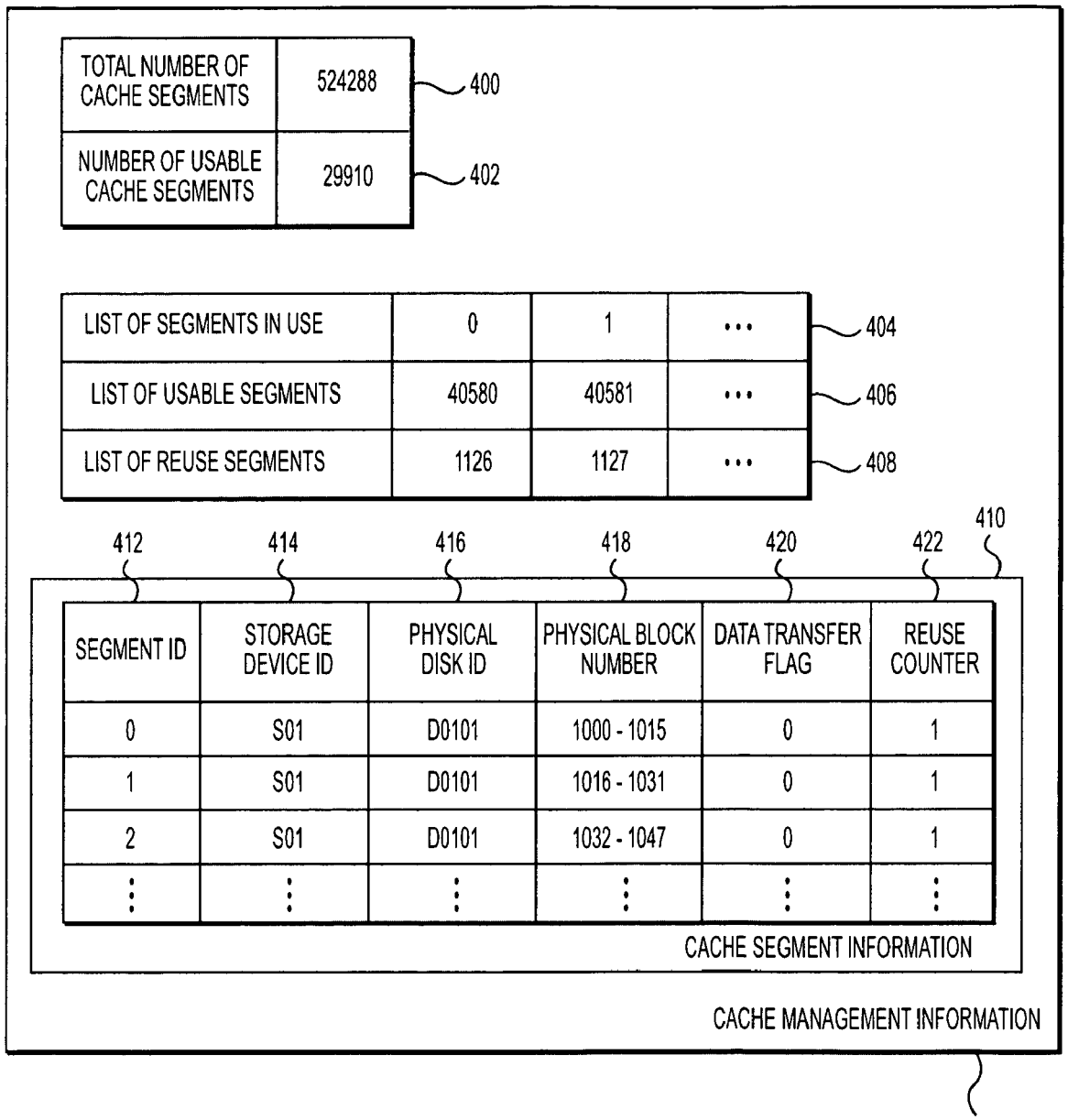
FIG. 4 shows one example of cache management information of the management server.

FIG. 4 shows an example of the configuration of the cache management information 120. In the present embodiment, the cache 104 is managed in divided units called segments. A part of the segments is reserved as reserve cache segments.

The cache management information 120 has a total number of cache segments 400, a number of usable cache segments 402, a list of segments in use 404, a list of usable segments 406, a list of reuse segments 408, and cache segment information 410. The total number of cache segments 400 stores the number of segments that exist in the cache 104. The usable number of cache segments 402 stores the number of usable segments of the segments that exist in the cache 104. The list of segments in use 404 is a list of segments that are in a state immediately prior to having their data transferred to the DB hosts 140. The list of usable segments 406 is a list of segments not scheduled to be read to the DB hosts 140 in the near future. The list of reuse segments 408 is a list of segments whose data have been transferred to the DB hosts 140 and are scheduled to be read to the DB hosts 140 again in the near future.

The cache segment information 410 consists of segment IDs 412, storage device IDs 414, physical disk IDs 416, physical block number sets 418, data transfer flags 420, and reuse counters 422.

Each segment ID 412 is an ID that identifies a segment managed by the given entry. The segment ID 412 and a segment have a one-to-one relationship. Each storage device ID 414 is an ID that identifies the storage device 130 that stores data retained in the segment managed by the given entry. Each physical disk ID 416 is an ID that identifies the physical disk 138 within the storage device 130 that stores data retained in the segment managed by the given entry. Each physical block number set 418 is a set of physical block numbers of the physical disk 138 that stores data retained in the segment managed by the given entry. Each data transfer flag 420 is a flag that indicates whether data in the segment managed by the given entry has been transferred to one of the DB hosts 140. If the flag is "0," it indicates that data has not been transferred; if the flag is "1," it indicates that the data has been transferred. Each reuse counter 422 is a counter that indicates the number of times data in the segment managed by the given entry is scheduled to be reused.

Figure 5:
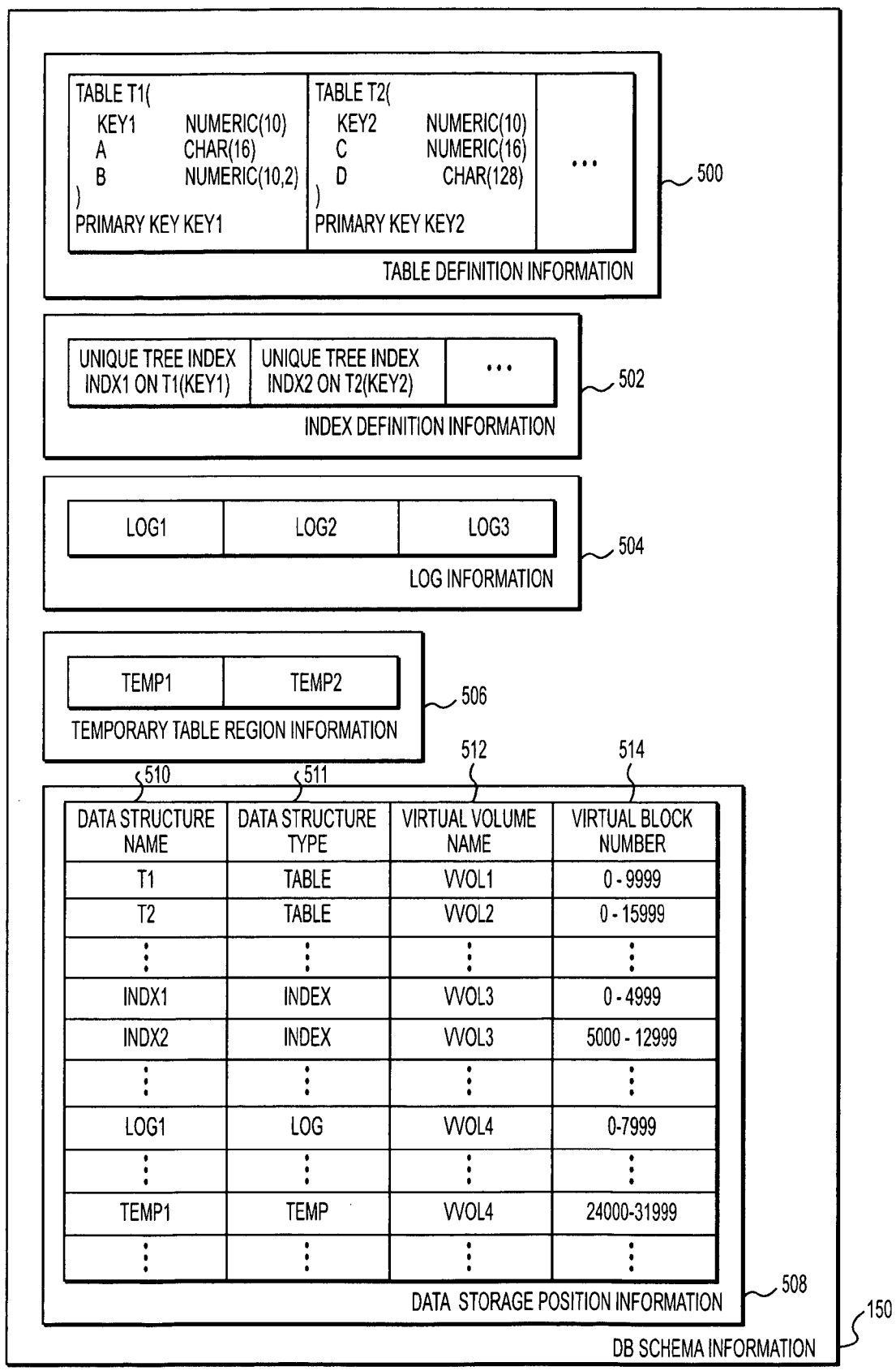
FIG. 5 shows one example of DB schema information of a DBMS within a DB host.
Figure 6A:
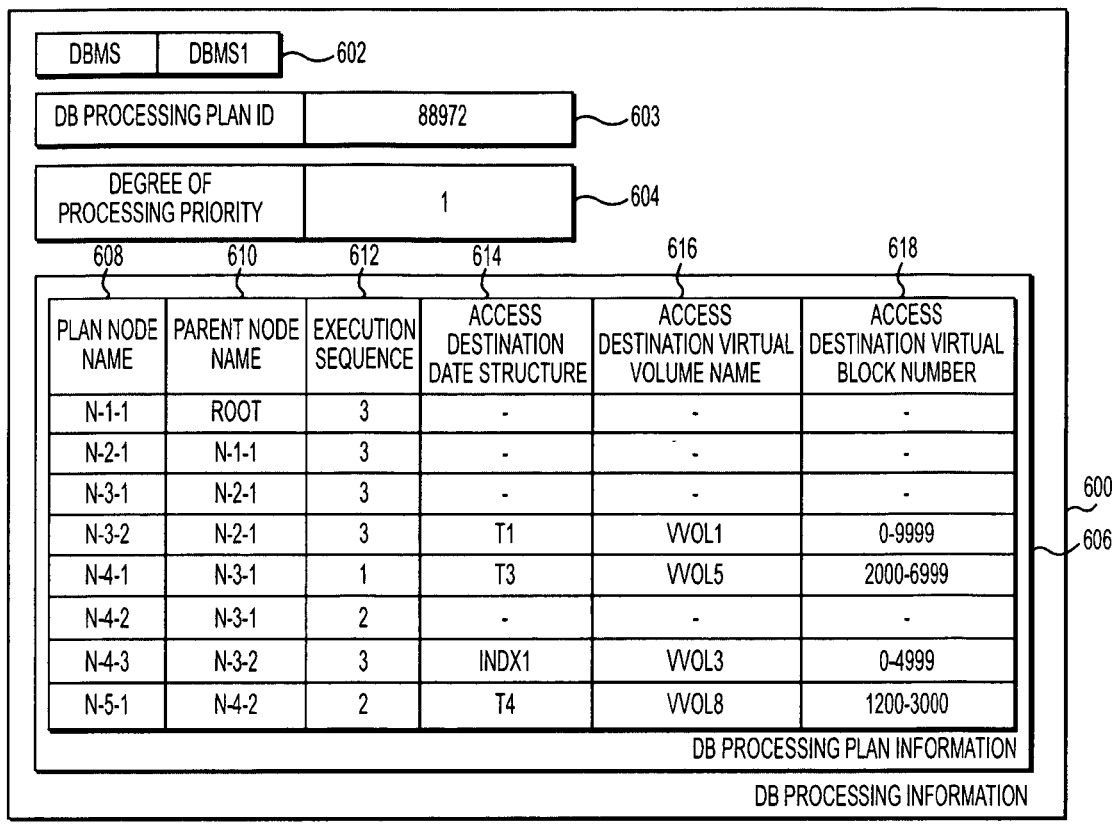
FIGS. 6(A) and 6(B) show examples of DB processing information and data transfer command issued by a DB host, respectively.
Figure 6B:
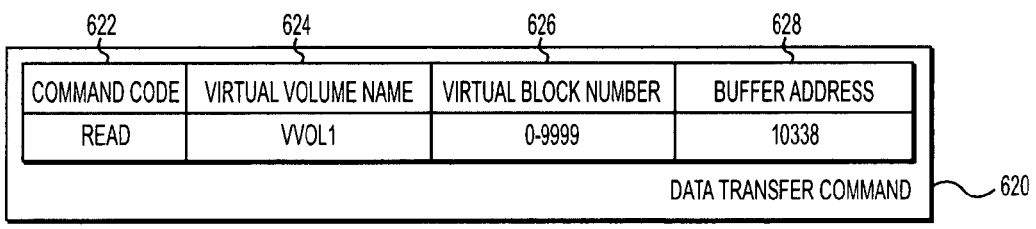

FIG. 5 shows an example of the configuration of the DB schema information 150. The DB schema information 150 has table definition information 500, index definition information 502, log information 504, temporary table region information 506, and data storage position information 508. Although the present specification describes typical DB schemata such as tables, indices, logs and temporary table regions as the DB schema information, there are numerous other DB schemata in actual DBMSs, which may also be included in the DB schema information 150. The DBMS 148 defines each of the DB schemata; stores, refers to and update data; and executes the DB processing requested.

The data storage position information 508 includes data structure names 510, data structure types 511, virtual volume names 512, and virtual block number sets 514. Each data structure name 510 is a name of data structure defined in a DB schema, and the corresponding data structure type 511 indicates the type of the data structure. Each virtual volume name 512 is the name of a virtual volume that stores the data structure of the given entry. Each virtual block number set 514 indicates virtual block numbers within a virtual volume that stores the data structure of the given entry. Using as an example the first entry of the data storage position information 508 in FIG. 5, "T1" is stored as the data structure name 510, "Table" as the data structure type 511, "VVOL1" as the virtual volume name 512, and "0-9999" as the virtual block number set, for this particular entry. These indicate that the table T1 defined by the table definition information 500 is stored at the virtual block numbers 0 through 9999 within the virtual volume VVOL1. When one of the DB hosts 140 actually accesses data stored in the disks 138 of the storage devices 130, it would do so using the virtual volume name 512 and the virtual block number set 514.

FIGS. '6(1) and 6(2) show examples of the configurations of the DB processing information 600 and a data transfer command 620, respectively. The DB processing information 600 consists of a DBMS name 602, a DB processing plan ID 603, the degree of processing priority 604, and the DB processing plan information 606. The DBMS name 602 is a name that identifies the DBMS that executes the applicable DB processing. The DB processing plan ID 603 is an ID that identifies the DB processing plan for the applicable DB processing. The degree of processing priority 604 is the degree of priority of the prefetching processing for the applicable DB processing.

The DB processing plan information 606 is an execution plan for the applicable DB processing and consists of plan node names 608, parent node names 610, execution sequences 612, the access destination data structures 614, the access destination virtual volume names 616, and the access destination virtual block number sets 618. Each plan node name 608 is the node name of the given entry. Each parent node name 610 is the node name of the parent entry to the given entry. Each access destination data structure 614, access destination virtual volume name 616, and access destination virtual block number set 618 indicate the data structure to be accessed for the given entry, and the virtual volume name and virtual block number set that store the data structure, respectively. If the data structure would not be accessed, "-" should be set.

The data transfer command 620 is a command that is issued when the DBMS 148 transfers data from the management server 100 or the subordinate storage devices 130; it consists of a command code 622, a virtual volume name 624, a virtual block number set 626, and a buffer address 628. In the command code 622, "READ," which means data transfer, is set. The virtual volume name 624 and the virtual block number set 626 are the virtual volume name and the set of virtual block numbers that store the data to be transferred. The buffer address 628 is the buffer address in the DB hosts 140 that receives the data.

Figure 7:
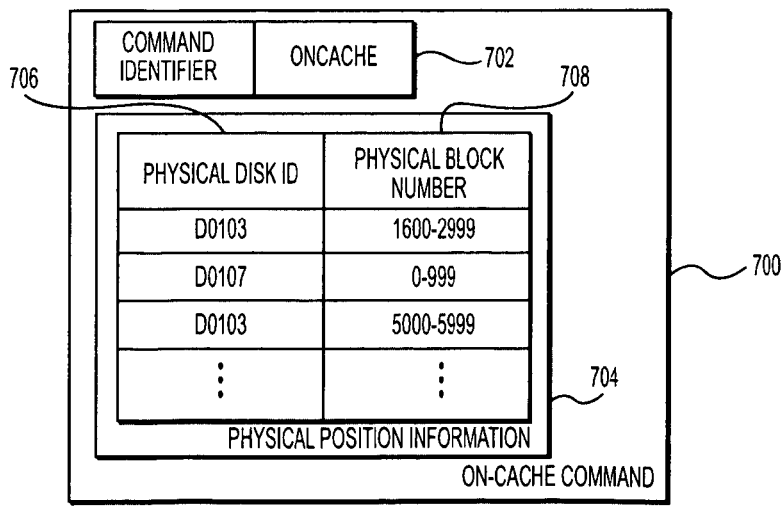
FIG. 7 shows one example of an on-cache command issued by the management server.

FIG. 7 shows an example of the configuration of an on-cache command 700 that reads designated data into the caches 134 of the storage devices 130. The on-cache command 700 consists of a command identifier 702 and data physical position information 704. The data physical position information 704 consists of physical disk IDs 706 and physical block number sets 708. When the management server 100 issues the on-cache command 700 to the storage devices 130, "ONCACHE," which indicates an on-cache command, is set as the command identifier 702, and the physical disk IDs and the physical block number sets of the physical storage regions that store the data to be read into the caches 134 are set as the physical disk IDs 706 and the physical block number sets 708, respectively.

FIGS. 8-14 are flowcharts of an example of the overall processing flow, as well as an example of a processing concerning data prefetching, according to the first embodiment. Next, the processing according to these flowcharts will be described.

Figure 8:
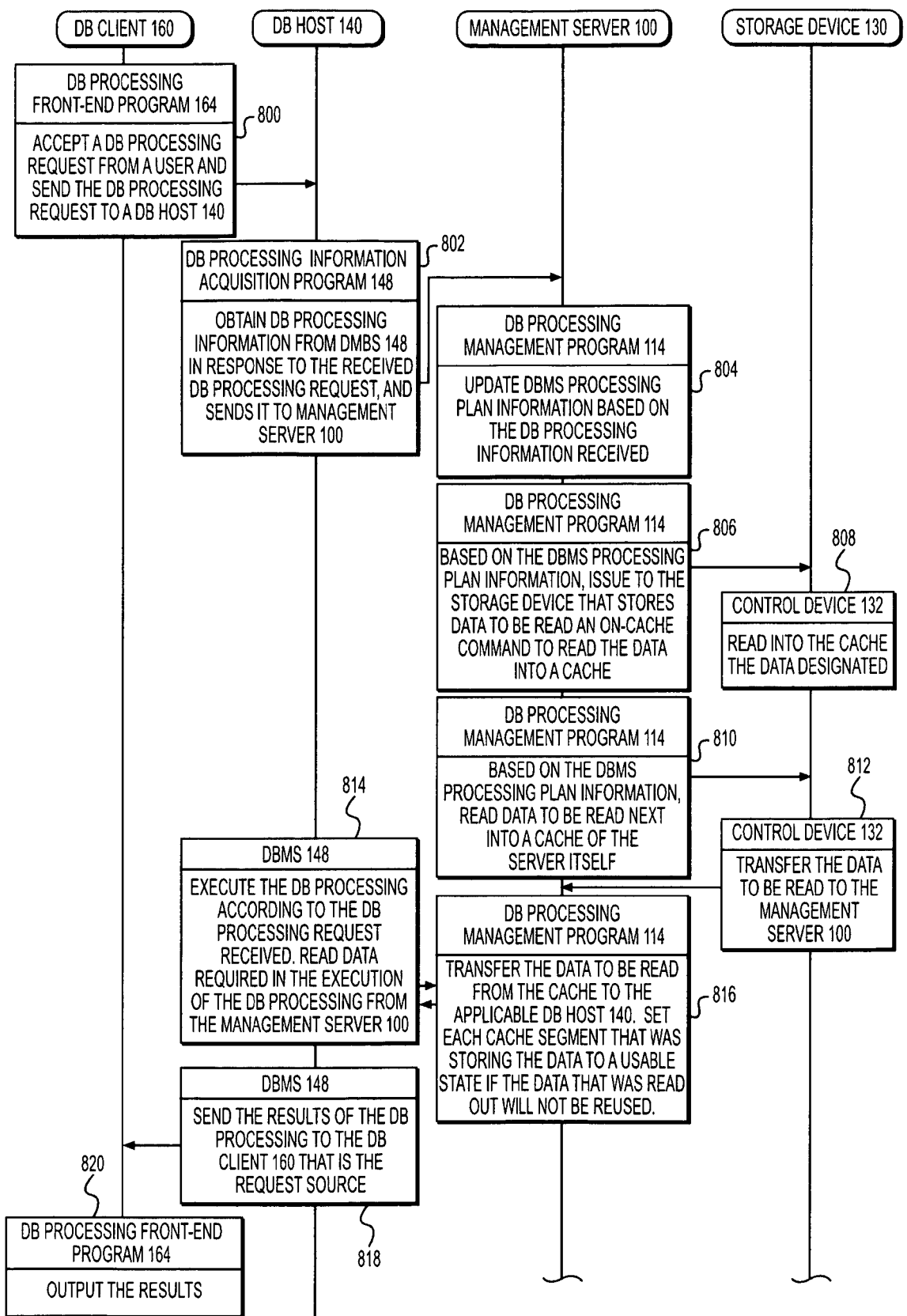
FIG. 8 shows a flowchart of one example of a series of processing that is executed after a DB client accepts a DB processing request from a user.

FIG. 8 is a flowchart indicating the flow of a series of processings from the point when one of the DB clients 160 accepts a command from a user instructing to execute a DB processing, to the point when the results of executing the DB processing is output. Thin arrows in FIG. 8 indicate commands or flows of control information, while thick arrows indicate flows of DB data.

The DB processing front-end program 164 accepts a DB processing request from a user via the input/output device 166 and sends the DB processing request to one of the DB hosts 140 (step 800).

The DB processing information acquisition program 146 acquires a DBMS name, a DB processing plan ID, and a DB processing plan that correspond to the DB processing request from the DBMS 148, which would actually execute the DB processing received; sets the various information acquired in the DB processing information 600; and sends the DB processing information 600 to the management server 100 (step 802).

The DB processing management program 114 updates the execution information ID management information 300 and the DBMS processing plan information 310 based on the DB processing information 600 received (step 804). Detailed processing will be described in the description of the flowchart for step 804 in FIG. 9.

The DB processing management program 114 determines data that would be read in the near future based on the execution information ID management information 300 and the DBMS processing plan information 310, and issues to the storage devices 130 that actually store the data the on-cache command 700 to read the data into the caches 134 (step 806).

Detailed processing will be described in the description of the flowchart for step 806 in FIG. 10. Although FIG. 8 indicates step 806 to be executed always following step 804, step 806 does not have to be executed every time step 804 is executed; for example, step 806 can be configured to be executed at any timing, such as at a certain interval.

The control devices 132 of the storage devices 130 that accepted the on-cache command 700 read into the caches 134 the data stored in the storage regions indicated by the physical disk IDs 706 and physical block number sets 708 designated by the data physical position information 704 in the on-cache command 700 (step 808).

The DB processing management program 114 determines the data that will be read in the near future based on the execution information ID management information 300 and the DBMS processing plan information 310, and reads the data from the storage devices 130 that actually store the data into the cache 104 using an SCSI command (step 810). Detailed processing will be described in the description of the flowchart for step 810 in FIGS. 11-13. Although FIG. 8 indicates step 810 to be executed following step 806, like step 806, it can be configured to be executed at any timing.

The control devices 132 of the storage devices 130 that accepted the SCSI command transfer the designated data to the cache 104 in the management server 100 (step 812).

The applicable DBMS 148 executes the DB processing according to the DB processing plan that corresponds to the content of the DB processing request. DB data required in the execution of the DB processing is read by issuing the data transfer command 620 to the management server 100 (step 814).

The DB processing management program 114 transfers to the applicable DB host 140 the data designated in the transfer command 620 received. After transferring the data, each cache segment that was storing the data is set to a usable state if the data that was transferred will not be reused (step 816). Detailed processing will be described in the description of the processing flow in FIG. 14.

When the execution of the DB processing is completed, the DBMS 148 sends the results of the execution to the DB client 160 that is the request source (step 818).

The DB processing front-end program 164 uses the input/output device 166 to output the results of the execution received from the DBMS 148 that corresponds to the DB processing request (step 820).

Figure 9:
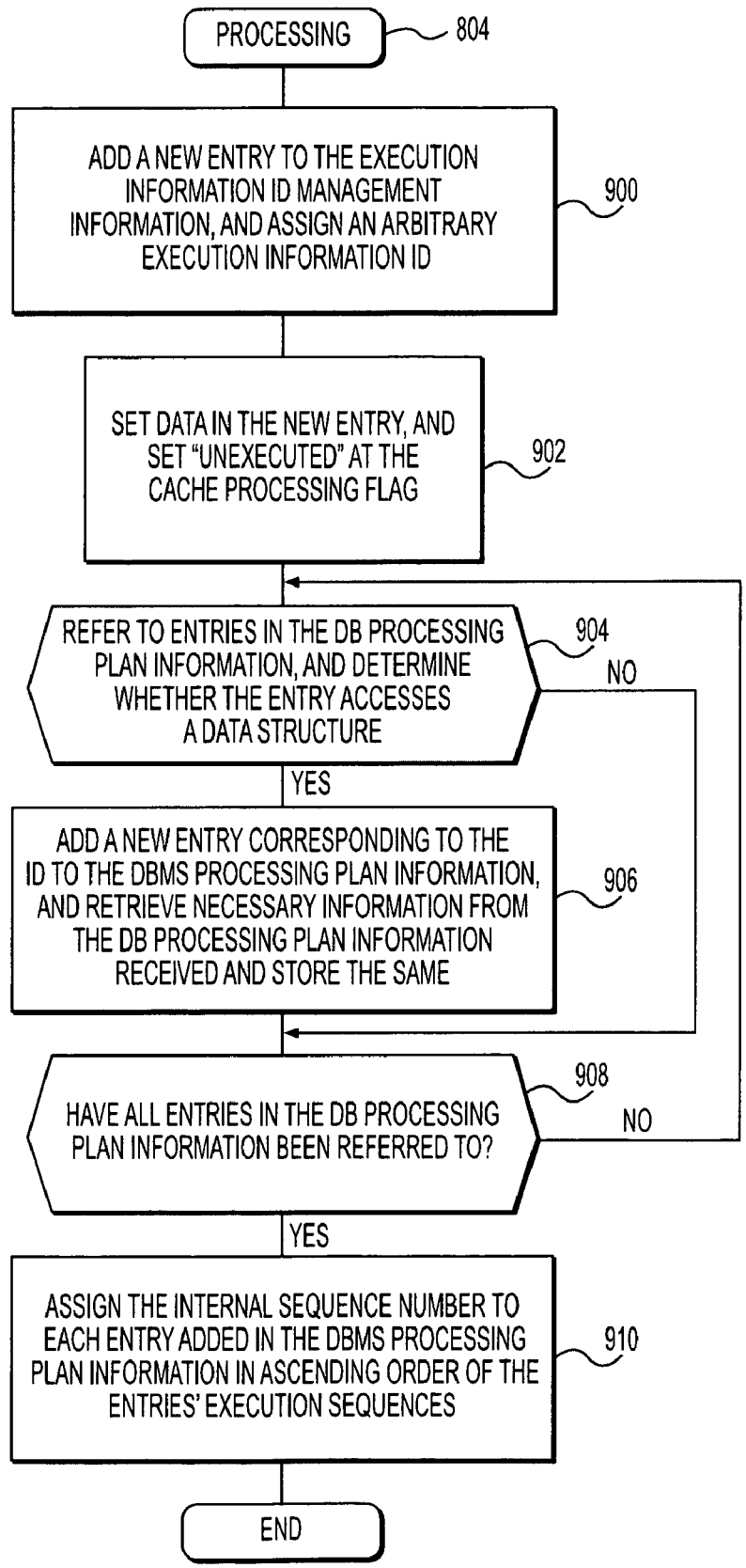
FIG. 9 shows a flowchart of one example of update processing of DBMS processing plan information.

FIG. 9 is a flowchart of an example of the processing that takes place in step 804 in FIG. 8.

Upon receiving the DB processing information 600 from the DB host 140, the DB processing management program 114 of the management server 100 adds a new entry to the execution information ID management information 300 and assigns an arbitrary ID to the execution information ID 302 for the entry (step 900).

Next, the DB processing management program 114 copies the DBMS name 602, the DB processing plan ID 603 and the degree of processing priority 604 in the DB processing information 600 received from the DB host 140 to the DBMS name 304, the DB processing plan ID 306 and the degree of processing priority 307, respectively, for the entry in the execution information ID management information 300, and sets the cache processing flag 308 to "0" (step 902).

The DB processing management program 114 refers to entries from the beginning in the DB processing plan information 606 in the DB processing information 600 received and determines whether the information for data structure to be accessed is designated in the access destination data structure 614 for each entry. If the data structure is designated for the given entry, the processing continues from step 906. If the data structure is not retained for the given entry, the processing continues from step 908 (step 904).

In step 906, the DB processing management program 114 adds a new entry to the DBMS processing plan information 310 and sets the same ID in the execution information ID 312 as the execution information ID that was assigned in step 900. In addition, it copies the access destination data structure 614, the access destination virtual volume name 616, the access destination virtual block number set 618 and the execution sequence 612 for the given entry referred to in the DB processing plan information 606 to the access destination data structure 316, the access destination virtual volume name 318, the access destination virtual block number set 320 and the execution sequence 322, respectively (step 906).

When all entries in the DB processing plan information 606 have been referred to, the processing continues from step 910. If there are any entries that have not yet been referred to, the processing continues from step 904 with the next entry (step 908).

In step 910, the DB processing management program 114 compares the execution sequences 322 for all entries that were added to the DBMS processing plan information 310, and assigns the internal sequence number 314 to each entry in ascending order of the entries' execution sequences, and terminates step 804 (step 910). If a plurality of entries has the same execution sequence 322, the internal sequence number 314 is assigned in the order the entries were added to the DBMS processing plan information 310.

Figure 10:
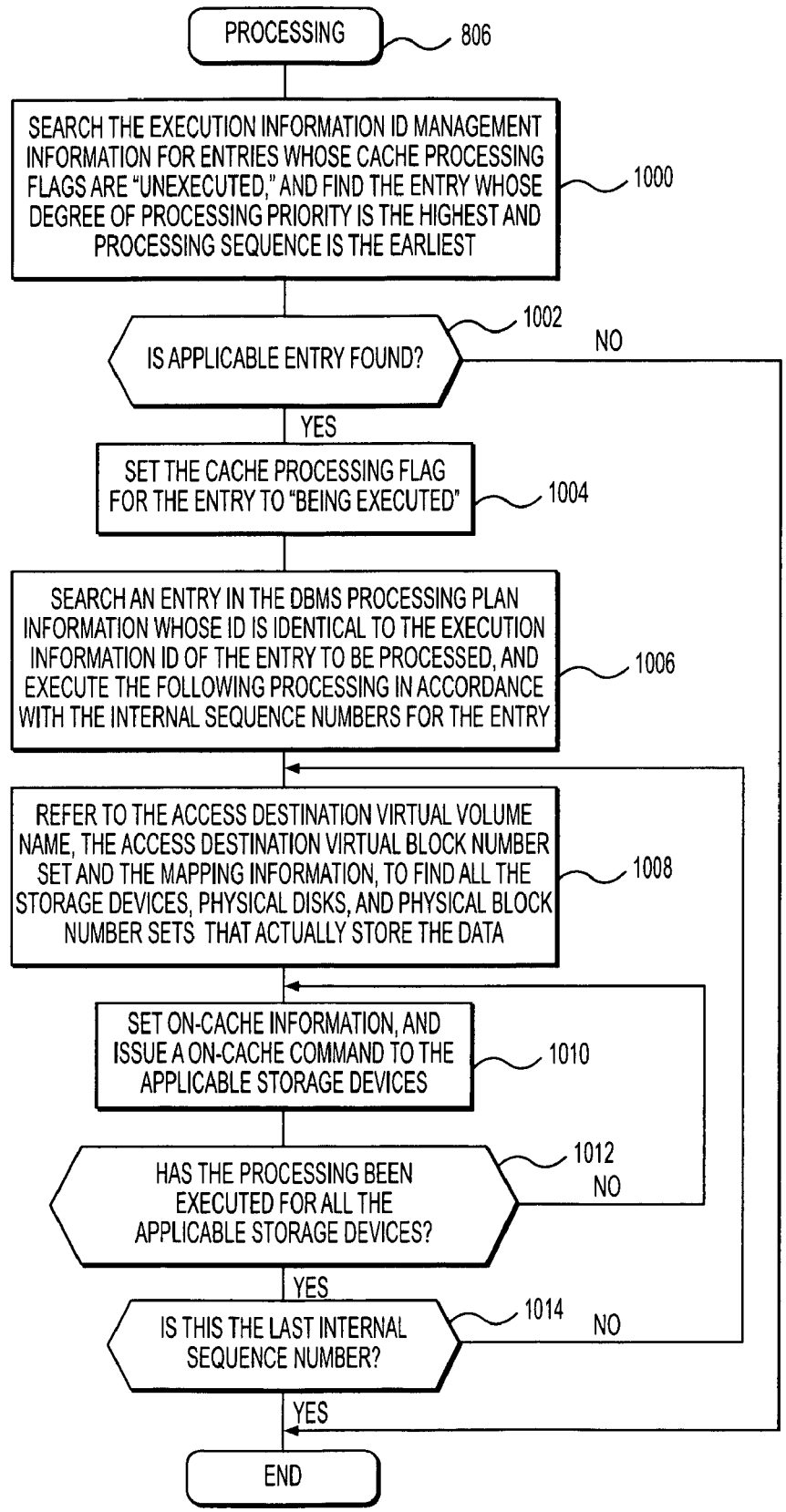
FIG. 10 shows a flowchart of one example of an on-cache command issue processing.

FIG. 10 is a flowchart of the processing that takes place in step 806 in FIG. 8.

The DBMS processing management program 114 searches the execution information ID management information 300 from the beginning for entries whose cache processing flags 308 are "0," and finds from among them the entry whose degree of processing priority 307 is the highest (step 1000).

If the entry to be processed is found in step 1000, the processing continues from step 1004; if no applicable entry is found, step 806 is terminated (step 1002).

In step 1004, the DB processing management program 114 sets the cache processing flag 308 for the entry to be processed to "1" (step 1004).

Next, the DB processing management program 114 refers to an entry in the DBMS processing plan information 310 whose ID is identical to the execution information ID 302 of the entry to be processed, and continues the processing from step 1008 in accordance with the sequence indicated by the internal sequence numbers 314 for the entry (step 1006).

The DB processing management program 114 searches the mapping information 116 to determine the physical storage positions (e.g., storage device IDs, physical disk IDs, physical block number sets) that correspond to the virtual volume regions indicated by the access destination virtual volume name 318 and the access destination virtual block number set 320 according to the internal sequence number 314 (step 1008).

The DB processing management program 114 sets in the data physical position information 704 of the on-cache command 700 the physical disk IDs and the physical block number sets of the physical storage positions determined in step 1008, and issues the on-cache command 700 to the applicable storage devices 130 (step 1010).

In step 1012, the DB processing management program 114 determines whether the on-cache command 700 has been issued to all storage devices 130 that were determined in step 1008. If it has been issued, the processing continues from step 1014. If there still are storage devices 130 to which the oncache command 700 should be issued, the processing continues from step 1010 with regard to such storage devices 130 (step 1012).

In step 1014, the DB processing management program 114 determines whether the internal sequence number 314 of the entry that was the subject of processing from step 1008 to step 1012 was the last internal sequence number. If it was the last internal sequence number, step 806 is terminated. If it was not the last internal sequence number, the processing continues from step 1008 with the entry with the next internal sequence number (step 1014).

Figure 11:
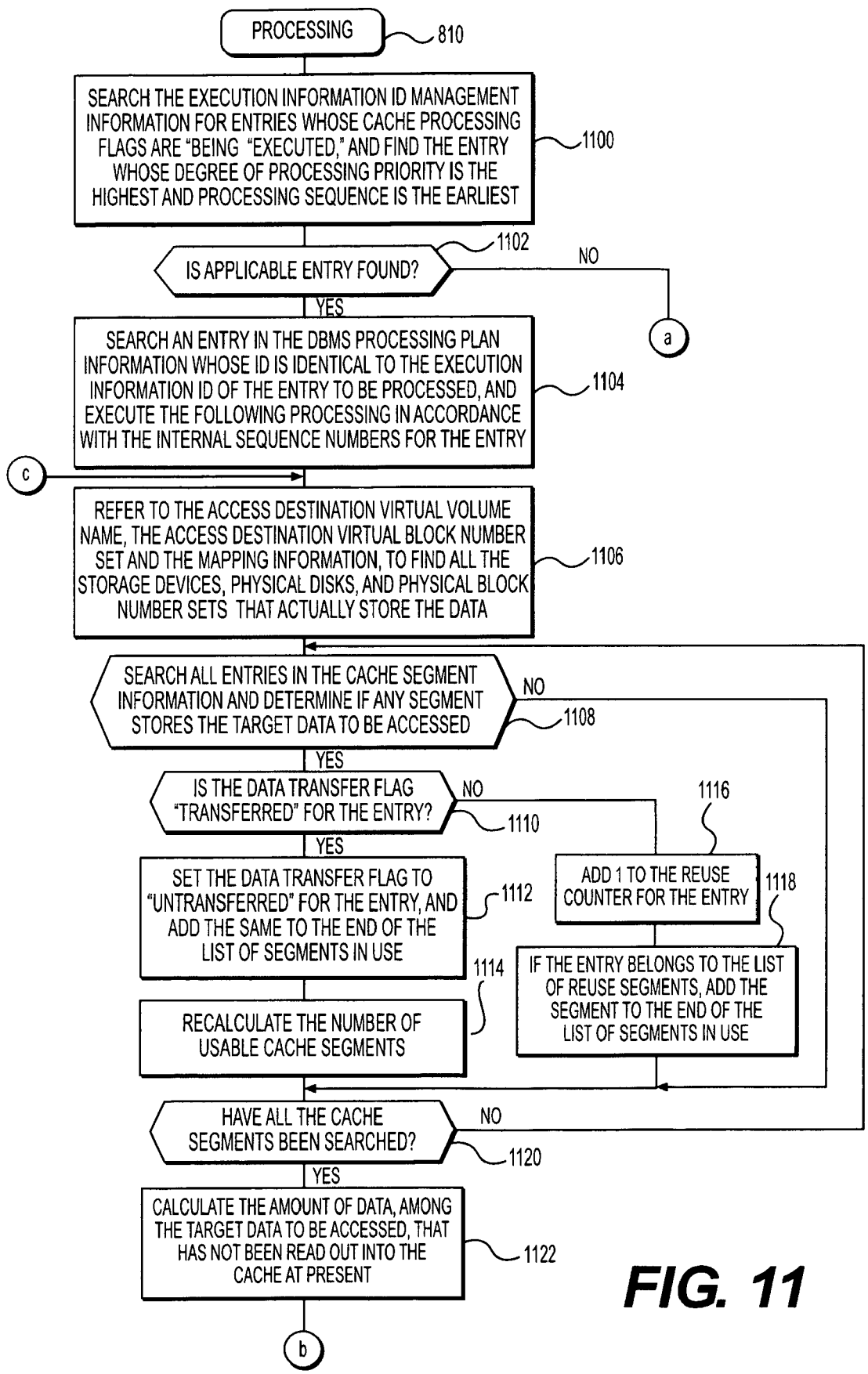
FIG. 11 shows a flowchart of one example of a processing to prefetch data from storage devices to the management server.
Figure 12:
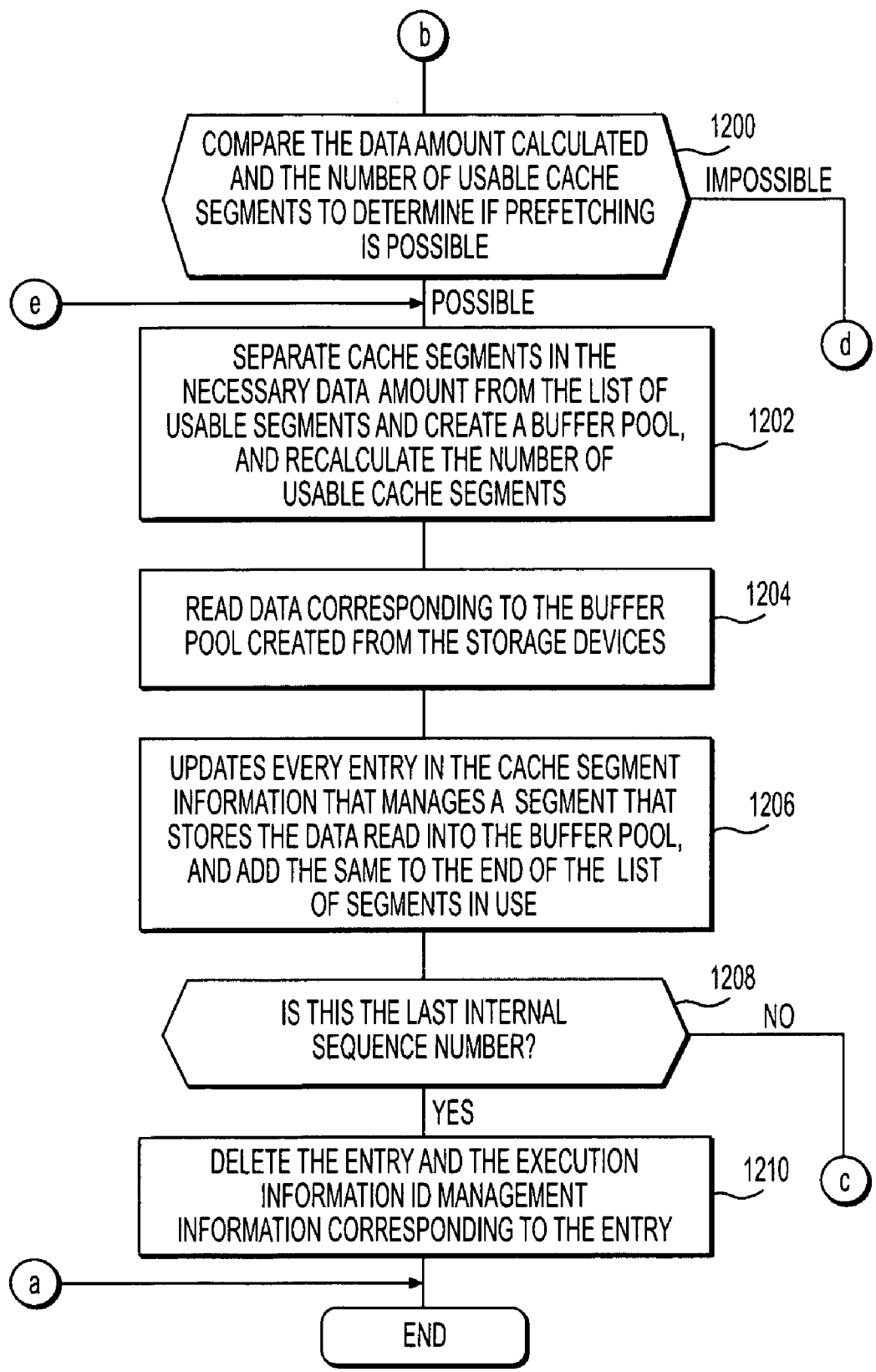
FIG. 12 shows a flowchart of one example of a processing to prefetch data from storage devices to the management server.
Figure 13:
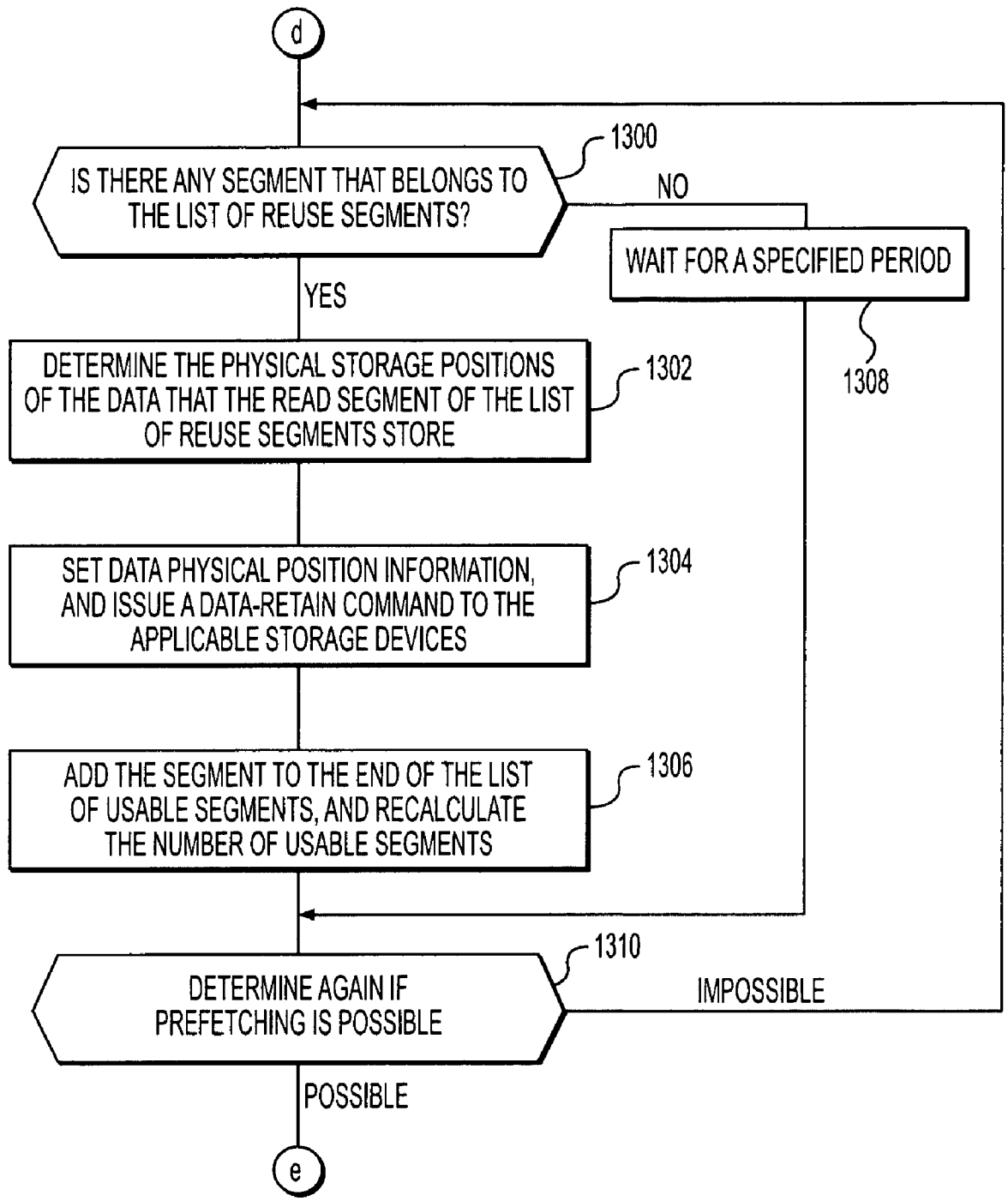
FIG. 13 shows a flowchart of one example of a processing to prefetch data from storage devices to the management server.

FIGS. 11-13 is a flowchart indicating the processing that takes place in step 810 in FIG. 8.

The DBMS processing management program 114 searches the execution information ID management information 300 from the beginning for entries whose cache processing flags 308 are "1," and finds from among them the entry whose degree of processing priority 307 is the highest (step 1100).

If the entry to be processed is found in step 1100, the processing continues from step 1104; if no applicable entry is found, step 810 is terminated (step 1102).

In step 1104, the DB processing management program 114 refers to an entry in the DBMS processing plan information 310 whose ID is identical to the execution information ID 302 of the entry to be processed, and continues the processing from step 1106 in accordance with the sequence indicated by the internal sequence numbers 314 for the entry (step 1104).

The DB processing management program 114 first searches the mapping information 116 to determine the physical storage positions (e.g., storage device IDs, physical disk IDs, physical block number sets) that correspond to the virtual volume regions indicated by the access destination virtual volume name 318 and the access destination virtual block number set 320 for the entry according to the internal sequence number 314 in the DBMS processing plan information 310 (step 1106).

Next, the DB processing management program 114 searches all entries in the cache segment information 410 and looks for every segment that retains data stored in the physical storage positions determined in step 1106. If a segment managed by an entry in the cache segment information 410 referred to retains the data, the processing continues from step 1110. If it does not retain the data, the processing continues from step 1120 (step 1108).

If it is judged in step 1108 that the data to be read is in a segment of the cache, the DB processing management program 114 determines whether the data to be read that is stored in the cache has already been transferred to the applicable DB host 140. If the data transfer flag 420 is "1" for the entry in the cache segment information 410 that indicates information concerning segments that store the data to be read, the data has already been transferred to the DB host 140 and the processing continues from step 1112. If the data transfer flag 420 is "0," the data has not been transferred to the DB host 140 and the processing continues from step 1116 (step 1110).

In step 1112, the DB processing management program 114 sets the data transfer flag 420 to "0" for the entry that stores information concerning the segment that stores the data to be read. At this point, the entry belongs to the list of usable segments 406. Since the processing in the current step puts the data in the segment managed by the entry in a reuse state, the DB processing management program 114 separates the entry from the list of usable segments 406 and adds the entry to the end of the list of segments in use 404 (step 1112).

Next, the DB processing management program 114 subtracts 1 from the usable number of cache segments 402 and continues the processing from step 1120 (step 1114).

If the data to be read still has not been transferred to the DB host 140, the DB processing management program 114 adds 1 to the reuse counter 422 for the entry in the cache segment information 410 that stores information concerning the segment that stores the data (step 1116).

If the entry belongs to the list of reuse segments 408, this means that the data in the segment managed by the entry is waiting to be reused. Since the processing in step 1116 puts the data in the segment managed by the entry in a reuse state, the DB processing management program 114 separates the entry from the list of reuse segments 408 and adds the entry to the end of the list of segments in use 404 (step 1118).

In step 1120, the DB processing management program 114 determines whether the processing from step 1108 to step 1118 has been executed for all entries in the cache segment information 410. If it has been executed, the processing continues from step 1122. If it has not been executed, the processing continues from step 1108 with the next entry (step 1120).

In step 1122, the DB processing management program 114 finds the data amount to be read based on the access destination virtual block number set 320 of the entry that was referred to in step 1106 and calculates the number of cache segments suitable for the data amount. The DB processing management program 114 also calculates the number of segments that store the data that has been read into the cache 104 in the processing from step 1108 to step 1122. Based on these two pieces of information, the DB processing management program 114 determines the number of segments required to prefetch data that does not currently exist in the cache 104 of the data that is to be read (step 1122).

If the number of segments determined in step 1122 is less than the number of usable segments 406, the DB processing management program 114 continues the processing from step 1202; if it is greater than the number of usable segments 406, the DB processing management program 114 continues the processing from step 1300 (step 1200).

The DB processing management program 114 separates from the beginning of the list of usable segments 406 the entries in the cache segment information 410 that manage segments that are equivalent to the number of segments determined in step 1122, and creates a buffer pool. The DB processing management program 114 also subtracts the number of segments that correspond to the entries separated from the usable number of cache segments 402 (step 1202).

Next, the DB processing management program 114 reads from the storage devices 130 into the buffer pool created in step 1202 the data not read into the cache 104 of the data to be read. The physical storage positions (e.g., storage device IDs, physical disk IDs, physical block number sets) determined in step 1106 are used as the physical storage positions of the data read source. If the data to be read exists over a plurality of storage devices 130, the data is read from the plurality of storage devices 130 applicable (step 1204).

In step 1206, the DB processing management program 114 updates every entry in the cache segment information 410 that manages a segment that stores the data read into the buffer pool. The updates are the storage device IDs 414, the physical disk IDs 416 and the physical block number sets 418 that store the original of the data read into the segments of the cache 104. At the same time, the DB processing management program 114 sets the data transfer flag 420 for each entry to "0" to correspond to the updates and clears the reuse counter 422 for each entry to 0 (step 1206).

The DB processing management program 114 determines whether the internal sequence number 314 of the entry in the DBMS processing plan information 310 that was the subject of processing from step 1106 to step 1206 was the last internal sequence number. If it was the last internal sequence number, the processing continues from step 1210. If it was not the last internal sequence number, the processing continues from step 1106 with the entry with the next internal sequence number (step 1208).

In step 1210, the DB processing management program 114 deletes the entry from the execution information ID management information 300 and the entry from the DBMS processing plan information 310 that have been processed and terminates step 810 (step 1210).

If it is determined in step 1200 that the usable number of cache segments 402 is insufficient, and if there is any entry in the cache segment information 410 that belongs to the list of reuse segments 408, the DB processing management program 114 in step 1300 in FIG. 13 continues the processing from step 1302. If there are no such entries, the DB processing management program 114 continues the processing from step 1308 (step 1300).

In step 1302, the DB processing management program 114 refers to an entry in the cache segment information 410 that is listed at the beginning of the list of reuse segments 408 and determines the physical storage positions (e.g., storage device IDs, physical disk IDs, physical block number sets) that store the data that is stored in the segments (step 1302).

Next, the DB processing management program 114 sets in the data physical position information 704 of the on-cache command 700 the physical disk IDs and the physical block number sets determined in step 1302, and issues the on-cache command 700 to the applicable storage devices 130 (step 1304).

Next, the DB processing management program 114 separates from the list of reuse segments 408 the entry in the cache segment information 410 that was referred to in step 1302 and adds the entry to the end of the list of usable segments 406. The DB processing management program 114 also adds 1 to the usable number of cache segments 402 and continues the processing from step 1310 (step 1306).

In step 1308, on the other hand, the DB processing management program 114 waits for a certain period of time before continuing the processing from step 1310 (1308). The reason for waiting in this step is as follows: since the timing for executing step 816 is the data transfer command 620 from the applicable DB host 140, there is a high possibility that step 816 is executed in parallel with the present step (step 810). Detailed processing that takes place in step 816 will be described later, but to briefly describe the processing, the management server 100 in step 816 transfers the designated data to the DB host 140 that is the request source and puts into a usable or reuse state the cache segment that retains the data transferred. Consequently, a data transfer may take place during the wait in step 1308 that increases the number of segments in usable or reuse state, which makes available segments that are required to prefetch data in the present processing. For this reason, the DB processing management program 114 waits for a certain period of time in step 1308 until segments required for prefetching becomes available through a data transfer from the management server 100 to the DB host 140.

In step 1310, the DB processing management program 114 judges whether the number of segments determined in step 1122 is less than the number of usable segments 406; if it is less, the processing continues from step 1202 since another prefetch processing can be executed; if it is greater, the processing continues from step 1300 (step 1310).

Figure 14:
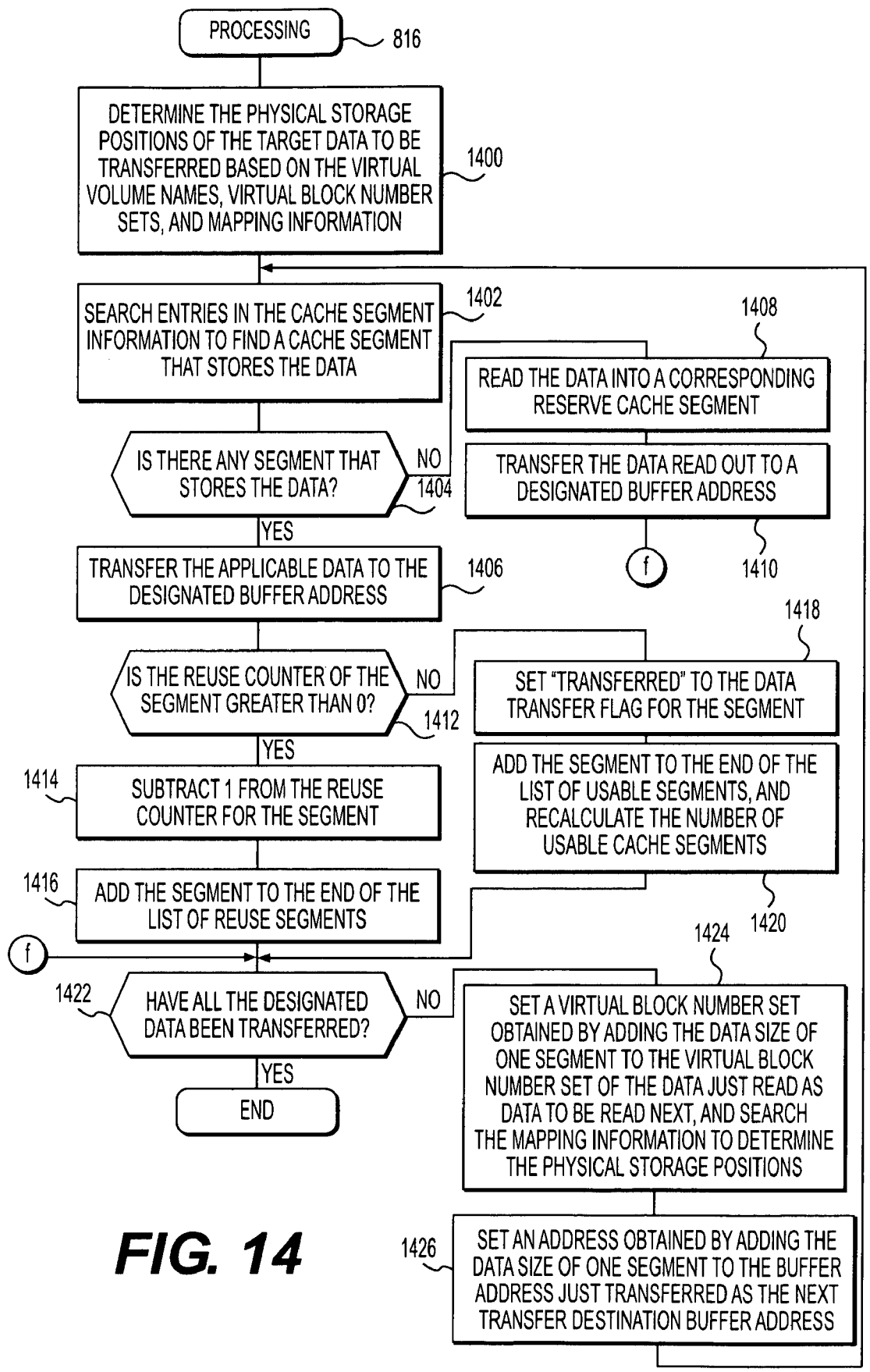
FIG. 14 shows a flowchart of one example of a data transfer processing to a DB host.

FIG. 14 is a flowchart indicating the processing that takes place in step 816 in FIG. 8.

The DB processing management program 114 searches the mapping information 116 to determine the physical storage positions (e.g., storage device IDs, physical disk IDs, physical block number sets) that correspond to the virtual volume regions indicated by the virtual volume name 624 and the virtual block number set 626 stored in the data transfer command 620 (step 1400).

Next, the DB processing management program 114 searches entries in the cache segment information 410 that belong to the list of segments in use 404, and finds a segment that stores the data with the physical storage positions determined in step 1400 (step 1402).

If an applicable segment is found in step 1402, the processing continues from step 1406; if an applicable segment is not found, the processing continues from step 1408 (step 1404).

In step 1406, the DB processing management program 114 transfers to the buffer address 628 indicated in the data transfer command 620 the data in the segment found in step 1402, and continues the processing from step 1412 (step 1406).

On the other hand, in step 1408, the DB processing management program 114 reads the data in the physical storage positions determined in step 1400 into a reserve cache segment (step 1408).

The DB processing management program 114 transfers to the buffer address 628 designated in the data transfer command 620 the data in the reserve cache segment that was read in step 1408, and continues the processing from 1422 (step 1410).

In step 1412, the DB processing management program 114 continues the processing from step 1414 if the reuse counter 422 is greater than 0 for the entry in the cache segment information 410 that manages the segment that retains the data transferred to the buffer address 628 in step 1406; if the reuse counter 422 is 0, the DB processing management program 114 continues the processing from step 1418 (step 1412).

In step 1414, the DB processing management program 114 subtracts 1 from the reuse counter 422 for the entry in the cache segment information 410 (step 1414).

The DB processing management program 114 separates the entry from the list of segments in use 404 and adds the entry to the end of the list of reuse segments 408, and continues the processing from step 1422 (step 1416).

On the other hand, in step 1418, the DB processing management program 114 sets the data transfer flag 420 to "1" for the entry in the cache segment information 410 (step 1418).

The DB processing management program 114 separates the entry from the list of segments in use 404 and adds the entry to the end of the list of usable segments 406, and adds 1 to the usable number of cache segments 402 (step 1420).

If all data designated in the data transfer command 620 has been transferred, the DB processing management program 114 terminates step 816. If there still are data that must be transferred, the DB processing management program 114 continues the processing from step 1424 (step 1422).

In step 1424, the DB processing management program 114 sets as the virtual block number set for the data to be transferred next the block number set resulting from adding the data size of one segment to the virtual block number set of the data just transferred, and searches the mapping information 116 to determine the physical storage positions (e.g., storage device IDs, physical disk IDs, physical block number sets) that correspond to the virtual volume regions indicated by the virtual volume name 624 and the new virtual block number set (step 1424).

The DB processing management program 114 sets as the buffer address of the next transfer destination the address resulting from adding the data size of one segment to the buffer address to which a transfer was just made, and continues the processing from step 1402 (step 1426). According to the first embodiment, in a DB system built in an inbound-type virtualization environment, the management server 100 can obtain from one of the DB hosts 140 information concerning a DB processing requested by one of the DB clients 160 to the DB host 140 and, based on the information, determine data that will be read in the near future. Consequently, the management server 100 can instruct to read into the caches 134 of the storage devices 130 the data determined, thereby prefetching the data to be read into the caches 134 of the storage devices 130, or it can instruct to prefetch into the cache 104 the data to be immediately read. As a result, the performance of the entire DB system can be improved.

Next, a system in accordance with a second embodiment of the present invention will be described.

Figure 15:
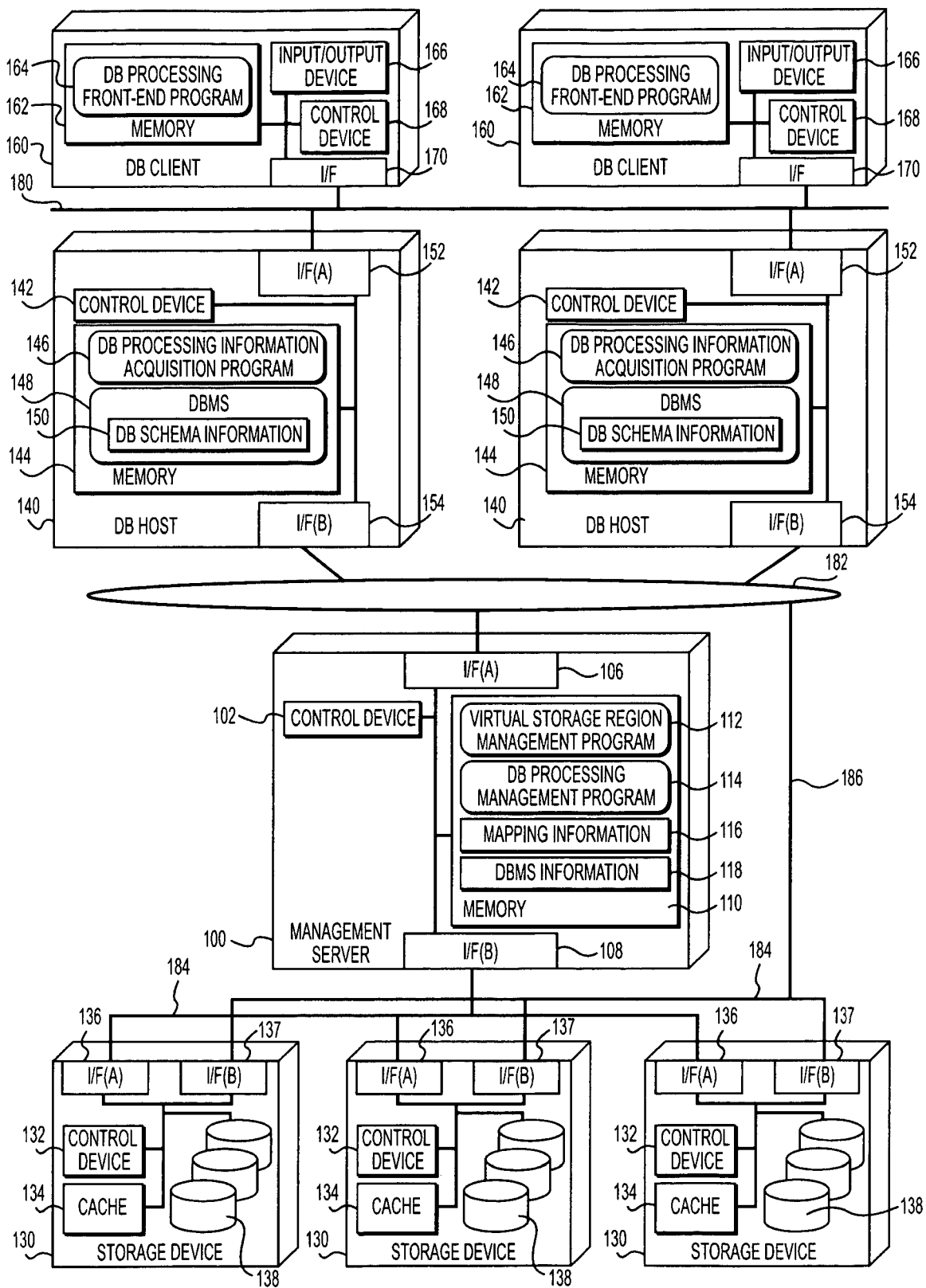
FIG. 15 shows a diagram of one example of a system configuration in accordance with a second embodiment of the present invention.

FIG. 15 is a diagram of an example of the system configuration according to the second embodiment of the present invention. It differs from the system configuration of the first embodiment in that there is no cache 104 or cache management information 120 in the management server 100, and that a network 186, as well as an I/F (B) 137 in each storage device 130, has been added to directly connect the storage devices 130 with (i.e., instead of via a management server 100) a network 182.

Of the processing described for the first embodiment, the processing that concerns cache processing in the management server 100 is omitted from the processing that takes place in the second embodiment. A DB processing management program 114 determines data that will be read in the near future based on DBMS information 118, issues an on-cache command 700 to the storage devices 130 that store the data to be read, and instructs to have the data read into caches 134. When a data transfer command 620 is received from a DBMS 148 of a DB host 140, the DB processing management program 114 sends to the DB host 140 that is the request source the physical storage positions of the storage devices 130 that store the data designated, and the DB host 140 uses the physical position information to directly access data in the storage devices 130 via the network 182 and the network 186.

According to the second embodiment, in a DB system built in an outbound-type virtualization environment, the management server 100 can obtain from one of the DB hosts 140 information concerning a DB processing requested by a DB client, determine the data to be read in the near future based on the information, and give an instruction to the applicable storage devices 130 to read the data into the caches 134 of the storage devices 130. As a result, data that the DB host 140 will read from the storage devices 130 in the near future can be prefetched into the caches 134 of the storage devices 130 in advance, thereby making it possible to improve the performance of the entire DB system.

Next, a system in accordance with a third embodiment of the present invention will be described.

The system according to the third embodiment is a system in which the cache 134 has been removed from each of the storage devices 134 in the system configuration according to the first embodiment. According to the third embodiment, there may be storage devices 130 with caches 134 and storage devices 130 without caches 134 within a single system.

Of the processing described for the first embodiment, the processing part in which a management server 100 issues the on-cache command 700 to the subordinate storage devices 130 is omitted from the processing that takes place in the third embodiment. A DB processing management program 114 determines data that will be read in the near future based on DBMS information, and directly reads the data from subordinate storage devices 130 that store the data to be read. When putting in a usable state a cache segment that retains data that is scheduled to be reused, the DB processing management program 114 puts the cache segment into a usable state without issuing an on-cache command 700 to the storage devices 130 that store the data in the segment.

According to the third embodiment, in a DB system built in a virtualization environment that uses storage devices without cache, such as HDD, the management server 100 obtains information concerning the DB processing requested, determines the data to be read in the near future based on the information, and prefetches the data to be read from the storage devices 130 into the cache 104, thereby making it possible to improve the performance of the entire DB system.

According to the present invention, in a system in which a DB is built in a virtualization environment, the performance of the entire DB system can be improved since data to be read from storage devices in the near future can be prefetched to shorten the time to access data stored in the storage devices.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A computer system comprising:
   a plurality of storage devices that store data of a database;
   a host computer that manages said database; and
   a management server that receives from said host computer an access request, transfers said access request to at least one of said storage devices, and manages a plurality of storage devices as a virtual storage which has a virtual volume region,
   wherein said host computer transmits to said management server, which manages said virtual storage region, a processing plan for a database management processing to be executed by said host computer,
   wherein, based on said processing plan, said management server sends an instruction to said at least one of the storage devices to store data in a cache memory of said one of the storage devices,
   wherein said one of said storage devices stores said data which is indicated to be stored in the cache memory of said one of the storage devices in said cache memory,
   wherein, when data in said cache memory is a data in response to said access request from said management server, said at least one of said storage devices transmits said data in said cache memory of said one of said storage devices to said management server,
   wherein said management server sends a read request to read data from at least one of said storage devices based on said processing plan before receiving said access request for accessing data from the host computer,
   wherein said at least one of said storage devices transmits said data to said management server in response to said read request from said management server,
   wherein said management server stores said data received from said at least one of said storage devices in a cache memory of said management server, and transmits said data stored in said cache memory of said management computer to said host computer when said access request for accessing said data is received from said host computer, and wherein said management server transmits said read request to said at least one of said storage devices based on an execution sequence for database management processing indicated by said processing plan.

2. A computer system comprising:

a plurality of storage devices that store data of a database;

a host computer that manages said database; and a management server that receives from said host computer an access request, transfers said access request to at least one of said storage devices and manages a plurality of storage devices as a virtual storage which has a virtual volume region, wherein said host computer transmits to said management server, which manages said virtual storage region, a processing plan for a database management processing to be executed by said host computer, wherein, based on said processing plan, said management server sends an instruction to said at least one of the storage devices to store data in a cache memory of said one of the storage devices, wherein said one of said storage devices stores said data which is indicated to be stored in the cache memory of said one of the storage devices in said cache memory, wherein, when data in said cache memory is a data in response to said access request from said management server, said at least one of said storage devices transmits said data in said cache memory of said one of said storage devices to said management server, wherein said management server sends a load request to obtain load data to said at least one storage device, said load data indicating a load of said at least one storage device, based on said processing plan before receiving said access request for accessing data from the host computer, wherein said at least one of said storage devices stores said data in a cache memory of said at least one of said storage devices and transmits said data to said management server when said access request for accessing said data is received from said host computer via said management server, wherein said management server transmits said data received from said at least one of said storage devices to said host computer, and wherein said management server transmits said load request to said at least one of said storage devices based on an execution sequence for database management processing indicated by said processing plan.

3. A method in a computer system which includes a plurality of storage devices that store data of a database, a host computer that manages said database, and a management server that receives from said host computer an access request, transfers said access request to at least one of said storage devices and manages a plurality of storage devices as a virtual storage which has a virtual volume region, said method comprising:

transmitting from said host computer to said management server, which manages said virtual storage region, a processing plan for a database management processing to be executed by said host computer;

sending, by said management server based on said processing plan, an instruction to said at least one of the storage devices to store data in a cache memory of said one of the storage devices;

storing, by said one of said storage devices, said data which is indicated to be stored in the cache memory of said one of the storage devices in said cache memory;

transmitting, by said at least one of said storage devices, when data in said cache memory is a data in response to said access request from said management server, said data in said cache memory of said one of said storage devices to said management server;

sending from said management server a read request to read data from at least one of said storage devices based on said processing plan before receiving said access request for accessing data from the host computer;

transmitting from said at least one of said storage devices said data to said management server in response to said read request from said management server; and storing by said management server said data received from said at least one of said storage devices in a cache memory of said management server, and transmitting said data stored in said cache memory of said management computer to said host computer when said access request for accessing said data is received from said host computer, wherein said step of sending from said management server a read request comprises the step of:

transmitting by management server said read request to said at least one of said storage devices based on an execution sequence for database management processing indicated by said processing plan.

4. A method in a computer system which includes a plurality of storage devices that store data of a database, a host computer that manages said database, and a management server that receives from said host computer an access request, transfers said access request to at least one of said storage devices and manages a plurality of storage devices as a virtual storage which has a virtual volume region, said method comprising:

transmitting from said host computer to said management server, which manages said virtual storage region, a processing plan for a database management processing to be executed by said host computer;

sending, by said management server based on said processing plan, an instruction to said at least one of the storage devices to store data in a cache memory of said one of the storage devices;

storing, by said one of said storage devices, said data which is indicated to be stored in the cache memory of said one of the storage devices in said cache memory;

transmitting, by said at least one of said storage devices, when data in said cache memory is a data in response to said access request from said management server, said data in said cache memory of said one of said storage devices to said management server;

sending from said management server a load request to obtain load data to said at least one of said storage devices, said load data indicating a load of said at least one storage device, based on said processing plan before receiving said access request for accessing data from the host computer;

storing by said at least one of said storage devices said data in a cache memory of said at least one of said storage devices and transmitting said data to said management server when said access request for accessing said data is received from said host computer via said management server; and transmitting by said management server said data received from said at least one of said storage devices to said host computer, wherein said step of sending from said management server a load request comprises the step of:

transmitting by management server said load request to said at least one of said storage devices based on an execution sequence for database management processing indicated by said processing plans.

5. A management server for use in a computer system which includes a plurality of storage devices that store data of a database, a host computer that manages said database, and said management server, said management server comprising:

a control device; and a cache memory, wherein said control device controls said management server to receive from said host computer an access request, transfer said access request to at least one of said storage devices, manage a plurality of storage devices as a virtual storage which has a virtual volume region, and receive from said host computer a processing plan for a database management processing to be executed by said host computer, wherein, based on said processing plan, said management server sends an instruction to said at least one of the storage devices to store data in a cache memory of said one of the storage devices, wherein said one of said storage devices stores said data which is indicated to be stored in the cache memory of said one of the storage devices in said cache memory, wherein, when data in said cache memory is a data in response to said access request from said management server, said at least one of said storage devices transmits said data in said cache memory of said one of said storage devices to said management server, wherein said control device further controls said management server to send a read request to read data from at least one of said storage devices based on said processing plan before receiving said access request for accessing data from the host computer, receive from said at least one of said storage devices said data in response to said read request, store said data received from said at least one of said storage devices in said cache memory and transmit said data stored in said cache memory of said management computer to said host computer when said access request for accessing said data is received from said host computer, and wherein said control device controls said management server to transmit said read request to said at least one of said storage devices based on an execution sequence for database management processing indicated by said processing plan.

6. A management server for use in a computer system which includes a plurality of storage devices that store data of a database, a host computer that manages said database, and said management server, said management server comprising:

a control device; and a cache memory, wherein said control device controls said management server to receive from said host computer an access request, transfer said access request to at least one of said storage devices, manage a plurality of storage devices as a virtual storage which has a virtual volume region, and receive from said host computer a processing plan for a database management processing to be executed by said host computer, wherein, based on said processing plan, said management server sends an instruction to said at least one of the storage devices to store data in a cache memory of said one of the storage devices, wherein said one of said storage devices stores said data which is indicated to be stored in the cache memory of said one of the storage devices in said cache memory, wherein, when data in said cache memory is a data in response to said access request from said management server, said at least one of said storage devices transmits said data in said cache memory of said one of said storage devices to said management server, wherein said control device further controls said management server to send a load request to obtain load data to said at least one storage device, said load data indicating a load of said at least one storage device, based on said processing plan before receiving said access request for accessing data from the host computer, store by said at least one of said storage devices said data in said cache memory, and transmit said data received from said at least one of said storage devices to said host computer, and wherein said control device controls said management server to transmit said load request to said at least one of said storage devices based on an execution sequence for database management processing indicated by said processing plan.

* * * * *